United States Patent
Junod et al.

(10) Patent No.: US 10,313,329 B2
(45) Date of Patent: *Jun. 4, 2019

(54) ON-DEMAND SERVICE SECURITY SYSTEM AND METHOD FOR MANAGING A RISK OF ACCESS AS A CONDITION OF PERMITTING ACCESS TO THE ON-DEMAND SERVICE

(71) Applicant: salesforce.com, inc., San Francisco, CA (US)

(72) Inventors: Forrest A. Junod, San Francisco, CA (US); Robert C. Fly, Moraga, CA (US); Peter Dapkus, Lafayette, CA (US); Scott W. Yancey, San Francisco, CA (US); Steven S. Lawrance, San Francisco, CA (US); Simon Z. Fell, Corte Madera, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/786,400

(22) Filed: Oct. 17, 2017

(65) Prior Publication Data
US 2018/0054433 A1 Feb. 22, 2018

Related U.S. Application Data

(63) Continuation of application No. 14/486,857, filed on Sep. 15, 2014, now Pat. No. 9,794,250, which is a (Continued)

(51) Int. Cl.
*H04L 9/30* (2006.01)
*H04L 29/06* (2006.01)
(Continued)

(52) U.S. Cl.
CPC .......... *H04L 63/083* (2013.01); *G06F 21/42* (2013.01); *G06F 21/60* (2013.01);
(Continued)

(58) Field of Classification Search
CPC ....... H04L 63/083; H04L 67/42; H04L 51/04; H04L 63/14; H04L 63/10; H04L 63/08;
(Continued)

(56) References Cited

U.S. PATENT DOCUMENTS 5,577,188 A 11/1996 Zhu
5,608,872 A 3/1997 Schwartz et al.
(Continued)

OTHER PUBLICATIONS

Non-Final Office Action for U.S. Appl. No. 13/874,349 dated Jan. 3, 2014, 32 pages.
(Continued)

*Primary Examiner* — Abu S Sholeman
(74) *Attorney, Agent, or Firm* — Jaffery, Watson, Mendonsa & Hamilton, LLP

(57) ABSTRACT

In accordance with embodiments, there are provided mechanisms and methods for managing a risk of access to an on-demand service as a condition of permitting access to the on-demand service. These mechanisms and methods for providing such management can enable embodiments to help prohibit an unauthorized user from accessing an account of an authorized user when the authorized user inadvertently loses login information. The ability of embodiments to provide such management may lead to an improved security feature for accessing on-demand services.

20 Claims, 8 Drawing Sheets

Related U.S. Application Data continuation of application No. 13/874,349, filed on Apr. 30, 2013, now Pat. No. 8,875,259, which is a continuation of application No. 13/424,271, filed on Mar. 19, 2012, now Pat. No. 8,863,251, and a continuation of application No. 13/424,285, filed on Mar. 19, 2012, now Pat. No. 8,898,753, and a continuation of application No. 12/271,661, filed on Nov. 14, 2008, now Pat. No. 8,584,212, and a continuation of application No. 12/271,661, filed on Nov. 14, 2008, now Pat. No. 8,584,212.

(60) Provisional application No. 60/988,263, filed on Nov. 15, 2007.

(51) Int. Cl.
*G06F 21/60* (2013.01)
*G06F 21/42* (2013.01)
*G06F 21/62* (2013.01)
*H04L 12/58* (2006.01)

(52) U.S. Cl.
CPC .......... *G06F 21/6218* (2013.01); *H04L 51/04* (2013.01); *H04L 63/08* (2013.01); *H04L 63/10* (2013.01); *H04L 63/14* (2013.01); *H04L 67/42* (2013.01)

(58) Field of Classification Search
CPC ..... H04L 29/06; H04L 12/58; G06F 21/6218; G06F 21/42; G06F 21/60; G06F 21/62
See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz |
| 5,805,154 A * | 9/1998 | Brown ............... H04H 20/38 348/E7.071 |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,893,032 A | 4/1999 | Maeda et al. |
| 5,918,159 A | 6/1999 | Fomukong et al. |
| 5,963,953 A | 10/1999 | Cram et al. |
| 6,092,083 A | 7/2000 | Brodersen et al. |
| 6,120,740 A | 9/2000 | Zardi et al. |
| 6,128,740 A | 10/2000 | Curry et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,363,210 B1 | 3/2002 | Owashi et al. |
| 6,367,077 B1 | 4/2002 | Brodersen et al. |
| 6,374,402 B1 | 4/2002 | Schmeidler et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,594,758 B1 | 7/2003 | Okui |
| 6,601,087 B1 | 7/2003 | Zhu et al. |
| 6,604,117 B2 | 8/2003 | Lim et al. |
| 6,604,128 B2 | 8/2003 | Diec |
| 6,609,115 B1 | 8/2003 | Mehring et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,735,310 B1 | 5/2004 | Hsing et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,976,176 B1 | 12/2005 | Schier |
| 7,062,502 B1 | 6/2006 | Kesler |
| 7,181,758 B1 | 2/2007 | Chan |
| 7,209,929 B2 | 4/2007 | Dominguez, Jr. et al. |
| 7,289,976 B2 | 10/2007 | Kihneman et al. |
| 7,308,496 B2 | 12/2007 | Yeager et al. |
| 7,317,797 B2 | 1/2008 | Vince |
| 7,340,411 B2 | 3/2008 | Cook |
| 7,356,482 B2 | 4/2008 | Frankland et al. |
| 7,395,219 B2 | 7/2008 | Strech |
| 7,401,094 B1 | 7/2008 | Kesler |
| 7,412,455 B2 | 8/2008 | Dillon |
| 7,460,668 B2 | 12/2008 | Grab |
| 7,508,789 B2 | 3/2009 | Chan |
| 7,529,929 B2 | 5/2009 | Asokan et al. |
| 7,539,862 B2 | 5/2009 | Edgett et al. |
| 7,552,481 B2 | 6/2009 | Moona et al. |
| 7,590,841 B2 | 9/2009 | Sherwani et al. |
| 7,613,919 B2 | 11/2009 | Bagley |
| 7,620,655 B2 | 11/2009 | Larsson et al. |
| 7,634,076 B2 | 12/2009 | Lee et al. |
| 7,698,160 B2 | 4/2010 | Beaven et al. |
| 7,711,647 B2 | 5/2010 | Gunaseelan et al. |
| 7,779,039 B2 | 8/2010 | Weissman et al. |
| 7,809,942 B2 | 10/2010 | Baran et al. |
| 7,818,792 B2 | 10/2010 | Shamsaasef et al. |
| 7,908,645 B2 | 3/2011 | Varghese et al. |
| 7,937,491 B1 | 5/2011 | Ng |
| 8,005,734 B1 | 8/2011 | Strech |
| 8,015,495 B2 | 9/2011 | Achacoso et al. |
| 8,074,276 B1 | 12/2011 | Beloussov et al. |
| 8,082,301 B2 | 12/2011 | Ahlgren et al. |
| 8,095,124 B2 * | 1/2012 | Balia ............... G06F 17/30867 455/418 |
| 8,095,413 B1 | 1/2012 | Beaven |
| 8,095,531 B2 | 1/2012 | Weissman et al. |
| 8,095,594 B2 | 1/2012 | Beaven et al. |
| 8,140,859 B1 | 3/2012 | Kahn et al. |
| 8,260,720 B1 | 9/2012 | Dixon et al. |
| 8,261,328 B2 | 9/2012 | Hinkemeyer et al. |
| 8,275,836 B2 | 9/2012 | Beaven et al. |
| 8,286,221 B2 | 10/2012 | Muller et al. |
| 8,370,627 B2 | 2/2013 | Yamazaki et al. |
| 8,370,848 B2 | 2/2013 | Cheenath et al. |

(56) References Cited

U.S. PATENT DOCUMENTS

| | | |
|---|---|---|
| 8,370,929 B1 | 2/2013 | Pennington et al. |
| 8,457,545 B2 | 6/2013 | Chan |
| 8,484,111 B2 | 7/2013 | Frankland et al. |
| 8,533,786 B2 | 9/2013 | Chabbewal et al. |
| 8,539,234 B2 | 9/2013 | O'Connor et al. |
| 8,548,982 B2 | 10/2013 | Weissman et al. |
| 8,566,127 B1 | 10/2013 | Strech |
| 8,584,212 B1 | 11/2013 | Junod et al. |
| 8,646,048 B2 | 2/2014 | Lee |
| 8,667,270 B2 | 3/2014 | Brutch et al. |
| 8,677,470 B1 | 3/2014 | Cadden et al. |
| 8,694,786 B2 | 4/2014 | Augu et al. |
| 8,745,698 B1 | 6/2014 | Ashfield et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0083341 A1 | 6/2002 | Feuerstein et al. |
| 2002/0083438 A1 | 6/2002 | So et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2002/0187775 A1 | 12/2002 | Corrigan et al. |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0041267 A1 | 2/2003 | Fee et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0200215 A1* | 10/2003 | Chen .................... G06F 21/10 |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0226036 A1 | 12/2003 | Bivens et al. |
| 2003/0228018 A1 | 12/2003 | Vince |
| 2003/0233404 A1 | 12/2003 | Hopkins |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0034797 A1 | 2/2004 | Hof |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0243803 A1 | 12/2004 | Codet et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0033850 A1 | 2/2005 | Kirkland |
| 2005/0044223 A1 | 2/2005 | Meyerson |
| 2005/0050555 A1 | 3/2005 | Exley et al. |
| 2005/0065925 A1 | 3/2005 | Weissman et al. |
| 2005/0086300 A1 | 4/2005 | Yeager et al. |
| 2005/0091098 A1 | 4/2005 | Brodersen et al. |
| 2005/0097320 A1 | 5/2005 | Golan et al. |
| 2005/0108102 A1* | 5/2005 | York .................... G06Q 30/06 705/26.41 |
| 2005/0172154 A1 | 8/2005 | Short et al. |
| 2005/0198171 A1 | 9/2005 | Landsman et al. |
| 2005/0223022 A1 | 10/2005 | Weissman et al. |
| 2005/0228874 A1 | 10/2005 | Edgett et al. |
| 2005/0240671 A1 | 10/2005 | Beyer et al. |
| 2005/0278787 A1 | 12/2005 | Naslund et al. |
| 2005/0283478 A1 | 12/2005 | Choi et al. |
| 2006/0020814 A1* | 1/2006 | Lieblich ................ G06F 21/316 713/182 |
| 2006/0021019 A1 | 1/2006 | Hinton et al. |
| 2006/0041507 A1 | 2/2006 | Novack et al. |
| 2006/0047957 A1 | 3/2006 | Helms et al. |
| 2006/0075083 A1 | 4/2006 | Liu |
| 2006/0101120 A1 | 5/2006 | Helsper et al. |
| 2006/0123484 A1 | 6/2006 | Babic et al. |
| 2006/0130147 A1* | 6/2006 | Von-Maszewski ........................ H04L 63/1408 726/25 |
| 2006/0143466 A1 | 6/2006 | Muller et al. |
| 2006/0206834 A1 | 9/2006 | Fisher et al. |
| 2006/0206940 A1* | 9/2006 | Strauss .................. G06F 21/55 726/23 |
| 2006/0212511 A1 | 9/2006 | Garcia-Martin |
| 2006/0282660 A1 | 12/2006 | Varghese et al. |
| 2007/0115917 A1 | 5/2007 | Miller et al. |
| 2007/0130456 A1 | 6/2007 | Kuo et al. |
| 2007/0130463 A1 | 6/2007 | Law et al. |
| 2007/0150480 A1* | 6/2007 | Hwang ................ G06Q 10/00 |
| 2007/0217612 A1 | 9/2007 | So |
| 2007/0226785 A1 | 9/2007 | Chow et al. |
| 2007/0270695 A1* | 11/2007 | Keen .................... G06F 19/321 600/448 |
| 2008/0040802 A1 | 2/2008 | Pierson et al. |
| 2008/0046983 A1 | 2/2008 | Lester et al. |
| 2008/0066165 A1 | 3/2008 | Rosenoer |
| 2008/0082540 A1 | 4/2008 | Weissman et al. |
| 2008/0086479 A1 | 4/2008 | Fry et al. |
| 2008/0086735 A1 | 4/2008 | Cheenath et al. |
| 2008/0120699 A1 | 5/2008 | Spear |
| 2008/0148358 A1* | 6/2008 | Denny .................. G06F 21/10 726/4 |
| 2008/0189788 A1 | 8/2008 | Bahl |
| 2008/0244706 A1 | 10/2008 | Lenoir et al. |
| 2008/0244724 A1 | 10/2008 | Choe et al. |
| 2008/0249972 A1 | 10/2008 | Dillon |
| 2008/0256357 A1 | 10/2008 | Iyengar et al. |
| 2008/0279384 A1 | 11/2008 | Ushiyama |
| 2008/0307412 A1* | 12/2008 | Marr .................. G06F 17/30902 717/177 |
| 2008/0320568 A1 | 12/2008 | Hawkins et al. |
| 2009/0063415 A1 | 3/2009 | Chatfield et al. |
| 2009/0100342 A1 | 4/2009 | Jakobson |
| 2009/0119500 A1 | 5/2009 | Roth et al. |
| 2009/0150525 A1 | 6/2009 | Edgett et al. |
| 2009/0177744 A1 | 7/2009 | Marlow et al. |
| 2011/0060694 A1 | 3/2011 | Rao |
| 2011/0197265 A1 | 8/2011 | Foley et al. |
| 2011/0214183 A1 | 9/2011 | Fudge |
| 2011/0246772 A1 | 10/2011 | O'Connor et al. |
| 2011/0247066 A1 | 10/2011 | Lee |
| 2012/0060213 A1 | 3/2012 | Childress et al. |
| 2012/0110020 A1 | 5/2012 | Weissman et al. |
| 2012/0117636 A1 | 5/2012 | Adams |
| 2012/0117637 A1 | 5/2012 | Little et al. |
| 2012/0226805 A1 | 9/2012 | Rojahn |
| 2012/0259671 A1 | 10/2012 | Oden |
| 2012/0272292 A1 | 10/2012 | Chabbewal et al. |
| 2013/0007862 A1 | 1/2013 | Kincaid |
| 2013/0015236 A1 | 1/2013 | Porter et al. |
| 2013/0024910 A1 | 1/2013 | Verma et al. |
| 2013/0073704 A1 | 3/2013 | Whitlock et al. |

(56) References Cited

U.S. PATENT DOCUMENTS

| | | | |
|---|---|---|---|
| 2013/0073715 | A1 | 3/2013 | Whitlock et al. |
| 2013/0073892 | A1 | 3/2013 | Whitlock et al. |
| 2013/0073893 | A1 | 3/2013 | Whitlock et al. |
| 2013/0086383 | A1 | 4/2013 | Galvao de Andrade et al. |
| 2013/0086667 | A1 | 4/2013 | Haven |
| 2013/0091547 | A1 | 4/2013 | Venkatesh et al. |
| 2013/0117810 | A1 | 5/2013 | Cheenath et al. |
| 2013/0185770 | A1 | 7/2013 | Patil |
| 2013/0191892 | A1 | 7/2013 | Cadden et al. |
| 2013/0218948 | A1 | 8/2013 | Jakobson |
| 2013/0218949 | A1 | 8/2013 | Jakobson |
| 2013/0218966 | A1 | 8/2013 | Jakobson |
| 2013/0276070 | A1 | 10/2013 | Lee |
| 2013/0311778 | A1 | 11/2013 | Cherukuri et al. |
| 2013/0326210 | A1 | 12/2013 | O'Connor et al. |
| 2014/0019880 | A1 | 1/2014 | Kucera et al. |
| 2014/0095545 | A1 | 4/2014 | Weissman et al. |
| 2014/0123243 | A1 | 5/2014 | Lee |
| 2014/0317762 | A1* | 10/2014 | Hug .................. G06Q 20/1235 726/29 |

OTHER PUBLICATIONS

Notice of Allowance for U.S. Appl. No. 13/874,349 dated Jun. 27, 2014, 17 pages.

Non-Final Office Action for U.S. Appl. No. 13/424,271 dated Oct. 24, 2013, 64 pages.

Notice of Allowance for U.S. Appl. No. 13/424,271 dated Jun. 20, 2014, 13 pages.

Non-Final Office Action for U.S. Appl. No. 13/424,285 dated Jan. 6, 2014, 43 pages.

Non-Final Office Action for U.S. Appl. No. 13/424,285 dated Jul. 8, 2014, 17 pages.

Non-Final Office Action for U.S. Appl. No. 12/271,661 dated Nov. 18, 2011, 27 pages.

Final Office Action for U.S. Appl. No. 12/271,661 dated Jun. 18, 2012, 26 pages.

Notice of Allowance for U.S. Appl. No. 12/271,661 dated Sep. 5, 2013, 11 pages.

U.S. Appl. No. 60/828,192, filed Oct. 4, 2006.

U.S. Appl. No. 10/817,161, filed Apr. 2, 2004.

Final Office Action for U.S. Appl. No. 14/486,857 dated Dec. 1, 2016, 24 pages.

Final Office Action for U.S. Appl. No. 14/486,857 dated Oct. 30, 2015, 17 pages.

Non-Final Office Action for U.S. Appl. No. 14/486,857 dated Mar. 27, 2015, 14 pages.

Non-Final Office Action for U.S. Appl. No. 14/486,857 dated May 20, 2016, 37 pages.

Notice of Allowance for U.S. Appl. No. 14/486,857 dated Jun. 21, 2017, 15 pages.

* cited by examiner

ON-DEMAND SERVICE SECURITY SYSTEM AND METHOD FOR MANAGING A RISK OF ACCESS AS A CONDITION OF PERMITTING ACCESS TO THE ON-DEMAND SERVICE

CLAIM OF PRIORITY

This application is a continuation of U.S. application Ser. No. 14/486,857, filed Sep. 15, 2014, now U.S. Pat. No. 9,794,250 issued Oct. 17, 2017, which is a continuation of U.S. application Ser. No. 13/874,349, filed Apr. 30, 2013, now U.S. Pat. No. 8,875,259 issued Oct. 28, 2014, which is a continuation of U.S. application Ser. No. 13/424,271, filed Mar. 19, 2012, now U.S. Pat. No. 8,863,251 issued Oct. 14, 2014 and U.S. application Ser. No. 13/424,285, filed Mar. 19, 2012, now U.S. Pat. No. 8,898,753 issued Nov. 25, 2014, which are continuations of U.S. application Ser. No. 12/271,661, filed Nov. 14, 2008, now U.S. Pat. No. 8,584,212 issued Nov. 12, 2013, which claims the benefit of U.S. Provisional Patent Application No. 60/988,263, filed Nov. 15, 2007, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to on-demand services, and more particularly to providing security for such on-demand services.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

There is often a desire to provide security to the aforementioned database systems. To date, however, these systems have been vulnerable to attacks such as phishing and other techniques used to access an account of a user. For example, such systems may become vulnerable when login information of a user is obtained using a phishing site or a keystroke logger. As a result, the user account and organizations associated with the account are vulnerable to attack.

BRIEF SUMMARY

In accordance with embodiments, there are provided mechanisms and methods for managing a risk of access to an on-demand service as a condition of permitting access to the on-demand service. These mechanisms and methods for providing such management can enable embodiments to help prohibit an unauthorized user from accessing an account of an authorized user when the authorized user inadvertently loses login information. The ability of embodiments to provide such management may lead to an improved security feature for accessing on-demand services.

In an embodiment and by way of example, a method is provided for managing a risk of access to an on-demand service as a condition of permitting access to the on-demand service. In use, a request to access an on-demand service is received from a requestor at one of a plurality of entities. It is determined whether the request is from a source providing a risk of access, the determination being based at least in part on stored information associated with at least one of a plurality of users or the one of the plurality of entities. Furthermore, the risk of access to the on-demand service by the requestor is managed as a condition of permitting the requestor to access the on-demand service. By this framework, the management of such risk may lead to an improved security feature for accessing on-demand services.

While the present invention is described with reference to an embodiment in which techniques for managing a risk of access to an on-demand service may be implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

FIG. 4A shows a user interface for configuring the management of a risk to an on-demand service, in accordance with one embodiment.

FIG. 4B shows a user interface for configuring the management of a risk to an on-demand service, in accordance with another embodiment.

FIG. 4C shows a user interface for configuring the management of a risk to an on-demand service, in accordance with another embodiment.

DETAILED DESCRIPTION

General Overview

Systems and methods are provided for managing a risk of access to an on-demand service as a condition of permitting access to the on-demand service.

There is a desire to provide security to on-demand database systems. To date, however, these systems have been vulnerable to attacks such as phishing and other techniques used to access an account of a user. For example, such systems may become vulnerable when login information of a user is obtained using a phishing site or a keystroke logger. As a result, the user account and organizations associated with the account are vulnerable to attack. Thus, mechanisms and methods are provided herein for managing a risk of access to an on-demand service as a condition of permitting access to the on-demand service. The ability of embodiments to provide such management may lead to an improved security feature for accessing on-demand services.

Next, mechanisms and methods will be described for managing a risk of access to an on-demand service as a condition of permitting access to the on-demand service, in accordance with various exemplary embodiments.

Figure 1:
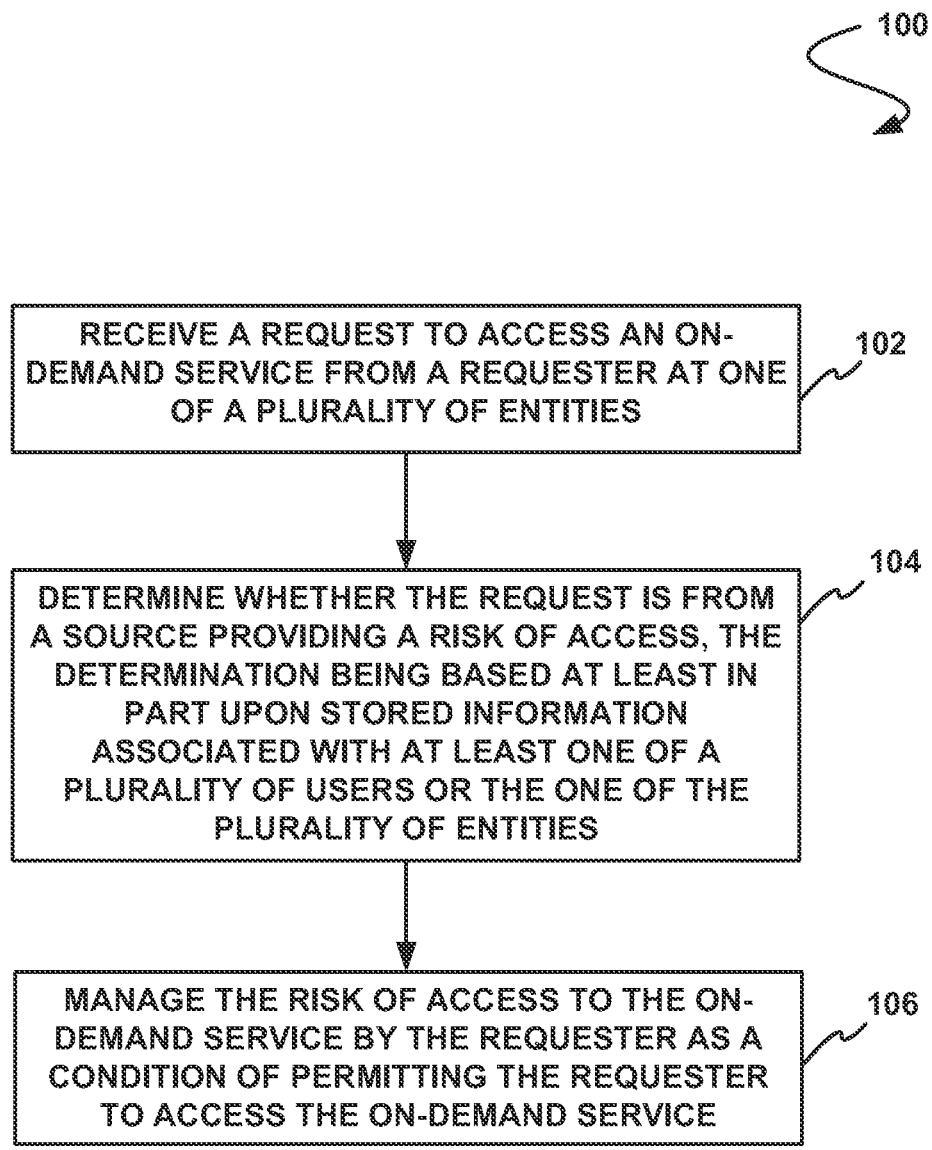
FIG. 1 illustrates a method for managing a risk of access to an on-demand service as a condition of permitting access to the on-demand service, in accordance with one embodiment.

FIG. 1 illustrates a method 100 for managing a risk of access to an on-demand service as a condition of permitting access to the on-demand service, in accordance with one embodiment. As shown, a request to access an on-demand service is received from a requestor at one of a plurality of entities. See operation 102.

In the context of the present description, an on-demand service may include any service that is accessible over a network. For example, in one embodiment, the on-demand service may include an on-demand database service. In this case, an on-demand database service may include any service that relies on a database system that is accessible over a network.

Furthermore, in the context of the present description, an entity refers to any organization, company, individual, or corporation, etc. that may utilize the on-demand service. The requestor may include any user or system capable of requesting access to the on-demand service. The requestor may be associated with, and/or a member of, the one of the plurality of entities.

Once the request to access the on-demand service is received, it is determined whether the request is from a source providing a risk of access, the determination being based at least in part on stored information associated with at least one of a plurality of users or the one of the plurality of entities. See operation 104. The risk of access may include a risk to the on-demand service, users, and/or entities associated therewith. In this case, the determination may be based, at least in part, on stored information associated with the plurality of users, the entity, or both.

For example, in one embodiment, determining whether the request is from a source providing the risk of access may be based at least in part on stored information associated with the plurality of users. In another embodiment, determining whether the request is from a source providing the risk of access may be based at least in part on stored information associated with the one of the plurality of entities.

Furthermore, the plurality of users may each be associated with the entity. For example, the users may be members, employees, representatives, etc. of the entity. Additionally, the information associated with the users and the entity may include any type of information, such as login information, subscription information, security information, computer or other device information, and/or any other information.

Determining whether the request for access is from a source providing a risk of access may occur in a variety of ways. For example, in one embodiment, determining whether the request is from a source providing a risk of access may include determining whether the request is from an unknown source. In this case, a list or database including a plurality of known sources may be provided.

Thus, a source of the request may be compared to the list of known sources. The sources may include entity sources and/or user sources. For example, information may be stored for a plurality of known entities and/or a plurality of users that may or may not be associated with those entities.

In another embodiment, determining whether the request is from a source providing a risk of access may include determining whether the request is from an unknown IP address. In this case, a list or database including a plurality of known IP addresses may be provided. Thus, an IP address of a source of the request may be compared to the list of known IP addresses. The sources may include IP address associated with entity sources and/or user sources.

In still another embodiment, determining whether the request is from a source providing a risk of access may include determining whether the request is from a known IP address. In this case, the known IP address may be associated with a known trusted source (e.g. a white-listed source, etc.) or a known un-trusted source (e.g. a black-listed source, etc.).

As shown further in FIG. 1, the risk of access to the on-demand service by the requestor is managed as a condition of permitting the requestor to access the on-demand service. See operation 106. Managing the risk of access to the on-demand service by the requestor as a condition of permitting the requestor to access the on-demand service may include a variety of management techniques.

For example, in one embodiment, managing the risk of access to the on-demand service by the requestor as a condition of permitting the requestor to access the on-demand service may include challenging the requestor to authenticate via email. In this case, an email may be sent to the requestor using an email address stored at or accessible by the on-demand service. The requestor may then authenticate any login credentials utilizing information included in the email. Upon authentication, the requestor may be permitted to access the on-demand service.

In another embodiment, managing the risk of access to the on-demand service by the requestor as a condition of permitting the requestor to access the on-demand service may include challenging the requestor to provide a valid token. As an option, a token may be provided to the requestor. In this case, the token may be provided to the requestor in a message (e.g. an email, a text message, etc.). The user may then validate the token such that access to the on-demand service is permitted.

In still another embodiment, managing the risk of access to the on-demand service by the requestor as a condition of permitting the requestor to access the on-demand service may include determining whether the requestor is permitted access by referencing at least one white list known only to the on-demand service. For example, the on-demand service may maintain or have access to a white list. The white list may be accessed and it may be determined, based on the white list, that the requestor is permitted to access the on-demand service. In the context of the present description, a white list refers to any list including trusted or accepted users and/or entities.

In yet another embodiment, managing the risk of access to the on-demand service by the requestor as a condition of permitting the requestor to access the on-demand service may include determining whether the requestor is permitted access by referencing at least one black list known only to the on-demand service. For example, the on-demand service may maintain or have access to a black list. The black list may be accessed and it may be determined, based on the black list, that the requestor is not permitted to access the on-demand service. In the context of the present description, a black list refers to any list including untrusted or unaccepted users and/or entities. As an option, the white list and the black list may be combined into one list with indicators indicating whether an associated user and/or entity are part of the white list or black list (e.g. allowed or blocked, etc.).

It should be noted that, the request to access the on-demand service may be received from the requestor in a variety of ways. For example, in one embodiment, receiving the request to access the on-demand service may include receiving a login request via a user interface. In this case, the requestor may provide login information using a user interface (e.g. a user interface associated with the on-demand service, etc.). In another embodiment, receiving the request to access the on-demand service may include receiving a login request via an application programming interface (API). In this case, login information associated with the requestor or a device of the requestor may be provided using an API (e.g. an API associated with a local or remote application, etc.).

Figure 2:
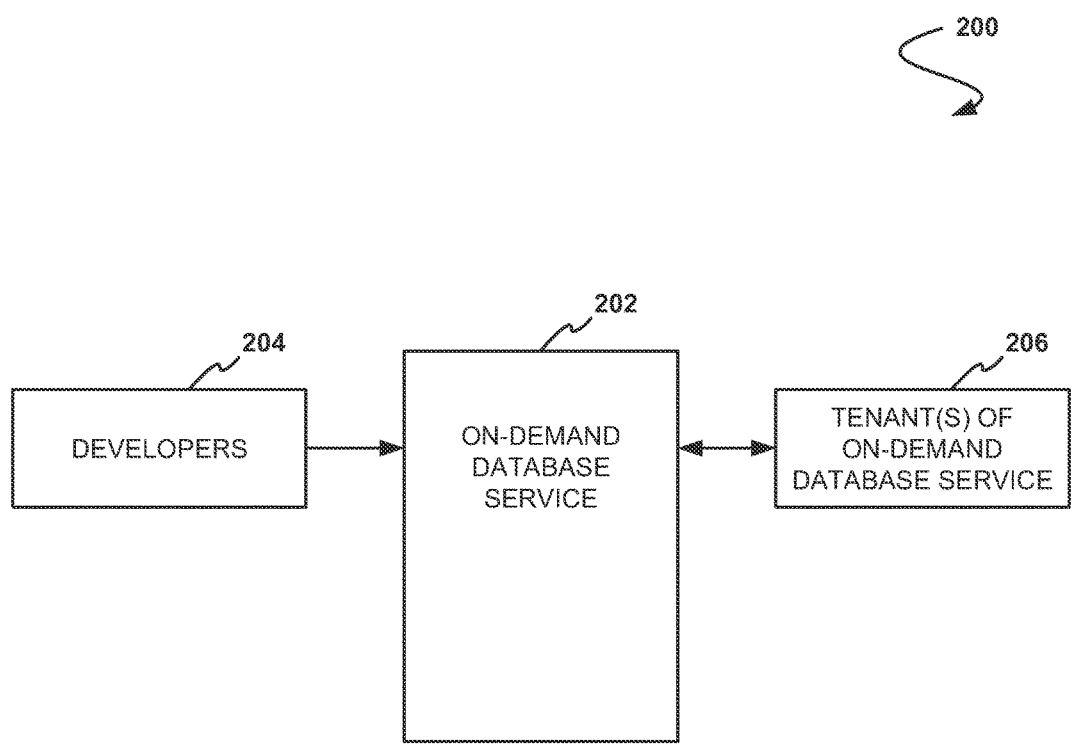
FIG. 2 illustrates a system for managing a risk of access to an on-demand service as a condition of permitting access to the on-demand service, in accordance with one embodiment.

FIG. 2 illustrates a system 200 for managing a risk of access to an on-demand service 202 as a condition of permitting access to the on-demand service 202, in accordance with one embodiment. As an option, the present system 200 may be implemented in the context of the details of FIG. 1. Of course, however, the system 200 may be implemented in any desired environment. The aforementioned definitions may apply during the present description.

As shown, the on-demand service 202 may include an on-demand database service. In one embodiment, the on-demand database service 202 may include a multi-tenant on-demand database service. In the present description, such multi-tenant on-demand database service may include any service that relies on a database system that is accessible over a network, in which various elements of hardware and software of the database system may be shared by one or more customers. For instance, a given application server may simultaneously process requests for a great number of customers, and a given database table may store rows for a potentially much greater number of customers.

As shown, the on-demand database service 202 may communicate with a plurality of developers 204. In use, the on-demand database service 202 is adapted to receive developed applications from the developers 204. In the context of the present description, the developers 204 may include any one or more entities (e.g. individuals, corporation, organization, etc.) that develop computer code. Further, the applications may include any computer code (e.g. a complete program, a partial program, a code segment, etc.).

In addition, the on-demand database service 202 communicates with one or more tenants 206 of the on-demand database service 202. In the aforementioned embodiment where the on-demand database service 202 includes a multi-tenant on-demand database service, a plurality of the tenants 206 may exist. In any case, a tenant refers to any one or more persons or entities that are capable of accessing the on-demand database service 202, in the present description. For example, the tenant(s) 206 may subscribe to the on-demand database service 202.

By this design, the on-demand database service 202 serves to provide access to the applications to the tenant(s) 206 of the on-demand database service 202. In use, the aforementioned applications may be under the control of the on-demand database service 202. By administering such control, an improved development/runtime framework, etc. is thereby provided.

In various embodiments, such control may be administered in any desired manner. For example, the on-demand database service 202 may enforce any desired policies by precluding access to applications by the tenant(s) 206, in situations where the applications do not adhere to the policies. In other embodiments, the on-demand database service 202 may enforce such policies by precluding or limiting functionality accessible to the developers 204, in such non-compliant scenario. For example, publication of an application to the on-demand database service 202 may be disallowed in the absence of meeting certain requirements. In one specific embodiment, the on-demand database service 202 may monitor and limit various aspects of the applications and terminate related code, based on a dynamic contextual limiter. Of course, the foregoing control may be implemented in any desired manner.

In one embodiment, the aforementioned control may take the form of limiting at least one aspect of the applications by the on-demand database service 202. For instance, such aspect may relate to processing, storage, bandwidth, etc. resources made available to the applications of the developers 204. By this design, the on-demand database service 202 may be able constrain the developers in a way that optimizes the ability of the on-demand database service 202 to service the tenant(s) 206 via the applications.

In various embodiments, such resources-related aspect may involve a database associated with the on-demand database service 202, a manner in which such database may be accessed utilizing the applications, etc. In such embodiments, the foregoing aspect may include, but is not limited to a number of columns of a database, a number of queries to a database in a predetermined timeframe, a number of rows returned by queries, a number of database statements (e.g. modification statements, etc.), a number of script statements between database statements, a number of rows processed (e.g. modified, etc.) in a predetermined timeframe, a number of transaction statements, a total number of uncommitted rows since a last transaction control statement, a total number of script statements since a last database call, a duration of processing, etc.

Of course, such exemplary list is not to be construed as limiting. For example, any aspect of the on-demand database service 202 (e.g. electronic mail management, etc.) may also be limited as well. In one specific instance, a number of e-mails one can send per request and/or a number of outbound web service calls made per request, may be limited. In various embodiments, limits may be applied to an application on a per-request basis or on a per-time-period (e.g. per day) basis. In the latter embodiment, such limitation may apply on a per-user or per-tenant basis.

In still additional embodiments, access to the applications by the tenant(s) 206 of the on-demand database service 202 may be controlled. For instance, a single instance of each application may be instantiated among a plurality of the tenant(s) 206 of the on-demand database service 202. Thus, only a single copy of the application need be stored by the on-demand database service 202, and simultaneously shared amongst the tenant(s) 206 in the foregoing manner.

It should be that the forgoing control may be static or dynamic, may or may not be uniformly applied, etc. For example, the foregoing aspects and related control criteria may or may not be different for different applications, tenants 206, etc. Just by way of example, the on-demand database service 202 may allow for more resources when running an upgrade script, with respect to when running a per-row database trigger, etc. Further, the on-demand database service 202 may allow for more resources for large tenants 206, etc.

In one embodiment, the on-demand database service 202 may be utilized to manage a risk of access to the on-demand service 202 as a condition of permitting access thereto. In this case, the managing may include managing a risk of access to the on-demand service 202 by a requester tenant as a condition of permitting the requestor tenant to access the on-demand service. In this way, the management of such risk may lead to an improved security feature for accessing on-demand services.

For example, this management may help prevent phishers from accessing an account of one of the tenant(s) 206, if the tenant inadvertently loses login information (e.g. a username and password, etc.). In one embodiment, this may be accomplished by determining whether a successful login has ever been completed for a particular user device (e.g. a computer, mobile phone, PDA, etc.) from which a request for access has been sent. If the device has previously been used to log into the on-demand service 202, access may again be allowed to the on-demand service 202, given user login information is verified. If the device has not previously been used to log into the on-demand service 202, access may be prohibited until additional information is provided.

In one embodiment, the additional information may include information associated with a user of the device who is requesting access to the on-demand service (i.e. the requestor). In this case, it may be desirable to further authenticate the user to determine if this user is the valid holder of the credentials provided for login, or if the user is a fraudulent user who obtained the credentials.

As an example, a user may attempt to log into or access an on-demand service from a computer that is not recognized or registered with the on-demand service. The on-demand service may then send the user an email. The email may be sent to an email address stored by the on-demand service that corresponds to login information provided by the user (e.g. a username, password, etc.). This email address may have been supplied to an on-demand service provider upon subscription to the on-demand service, for example.

In one embodiment, the email may include a link to the on-demand database service and a unique token. Upon selection of the link by the user, the token may be validated. If the validation is successful, the computer may be registered for that user.

In the case where a device sending the request is not recognized, two scenarios may be present. First, a valid user may be logging in from a new machine. Second, a fraudulent user may be trying to login with stolen credentials. In the case of a valid user, the valid user will receive the email and be able to further authenticate the identity of the user. In the case of the fraudulent user, the fraudulent user will not receive the email and thus will not perform the additional authentication step.

The authentication email may be generated as soon as the valid username and password are entered from a machine that is not recognized as registered. As noted, this email may include a token. The token may include any token or key capable of being utilized to validate a user.

In one embodiment, the token may include a Base-64 encoded querystring parameter that is AES 128-bit encrypted with a unique key for every user. Furthermore, as an option, there may be several parameters used for validation encrypted within the querystring. For example, in various embodiments, the parameters may include a username (e.g. for the requestor, etc.), an entity identification (e.g. an organization ID associated with the requestor, etc.), an IP address (e.g. indicating where the request originated, etc.), a time stamp of initial request, and/or various other parameters capable of being used for validation.

As another option, the token may be a one-time use token. In this case, after the token is used once, it may not be re-used. Furthermore, the token may be configured to expire after a predetermined amount of time. In one embodiment, the token may not be valid for longer than ten minutes. This may help prevent replay attacks. The time stamp of initial request parameter may be utilized to determine whether this time criteria is met.

When a valid user receives the email, the user may then click on the link, and in turn, validate the token and register the device that sent the request. Once the token is validated at the on-demand service, the on-demand service may allow the user access and may set a machine identifier on the user device such that, in the future, the device will be recognized.

The machine identifier may be set using various techniques. For example, in one embodiment a cookie may be utilized to set the machine identifier. In this case, the cookie may be a permanent cookie. In various other embodiments, the machine identifier may be set using flash local storage, userData (e.g. for Internet Explorer, etc.), and document object model (DOM) storage (e.g. for Firefox 2+, etc.).

In one embodiment, the machine identifier may be set using multiple or all of a cookie, flash local storage, userData, and DOM storage. As an option, all of these may be set with the same value to minimize the number of times users are required to register a machine. For example, if a user chose to clear cookies every time the browser is closed, the machine identifier may be recreated by accessing one of the values that has not been deleted. Additionally, a client side script may be utilized to ensure that if one of these storage options is populated, the rest of the storage options are populated as well. In still other embodiments, the machine ID may be set in a querystring of a browser bookmark corresponding to the on-demand service.

In one embodiment, the machine identifier may be a token that has a long shelf life. In this case, the machine identifier may be configured to expire after a predetermined amount of time to prevent malware from stealing the password and cookie associated with the machine identifier. As an option, the machine identifier or an encrypted token including the machine identifier, may include a timestamp of when the machine identifier was set and information about a user the machine identifier is associated with. As another option, the machine identifier may be associated with an IP address.

When the on-demand service receives a machine identifier cookie, the on-demand service may validate that that the cookie is being used by the correct user and may analyze an associated time stamp. If the timestamp is older than a predetermined amount of time (e.g. more than one week old, etc.), a new machine identifier may be generated. Regenerating a new machine identifier may not require that the user re-register the user device because the new cookie value may be set by the on-demand service.

Any other machine identifier storage objects (e.g. a cookie, flash local storage, userData, etc.) may also be updated on the side of the user device (i.e. the client side). Once the machine identifier is set, the user device is registered. It should be noted that the machine identifiers may be unique for every user and associated user device.

When a device of a user is already registered with the on-demand service, the user may not need to perform any other functions to identify themselves beyond initially providing a username and password. When the user logs in, the machine identifier cookie may be provided in a request for access to the on-demand service, along with the login credentials. The machine identifier, the username, and password, etc. may be validated, and if everything is correct, the user may be allowed access to the on-demand service.

Figure 3:
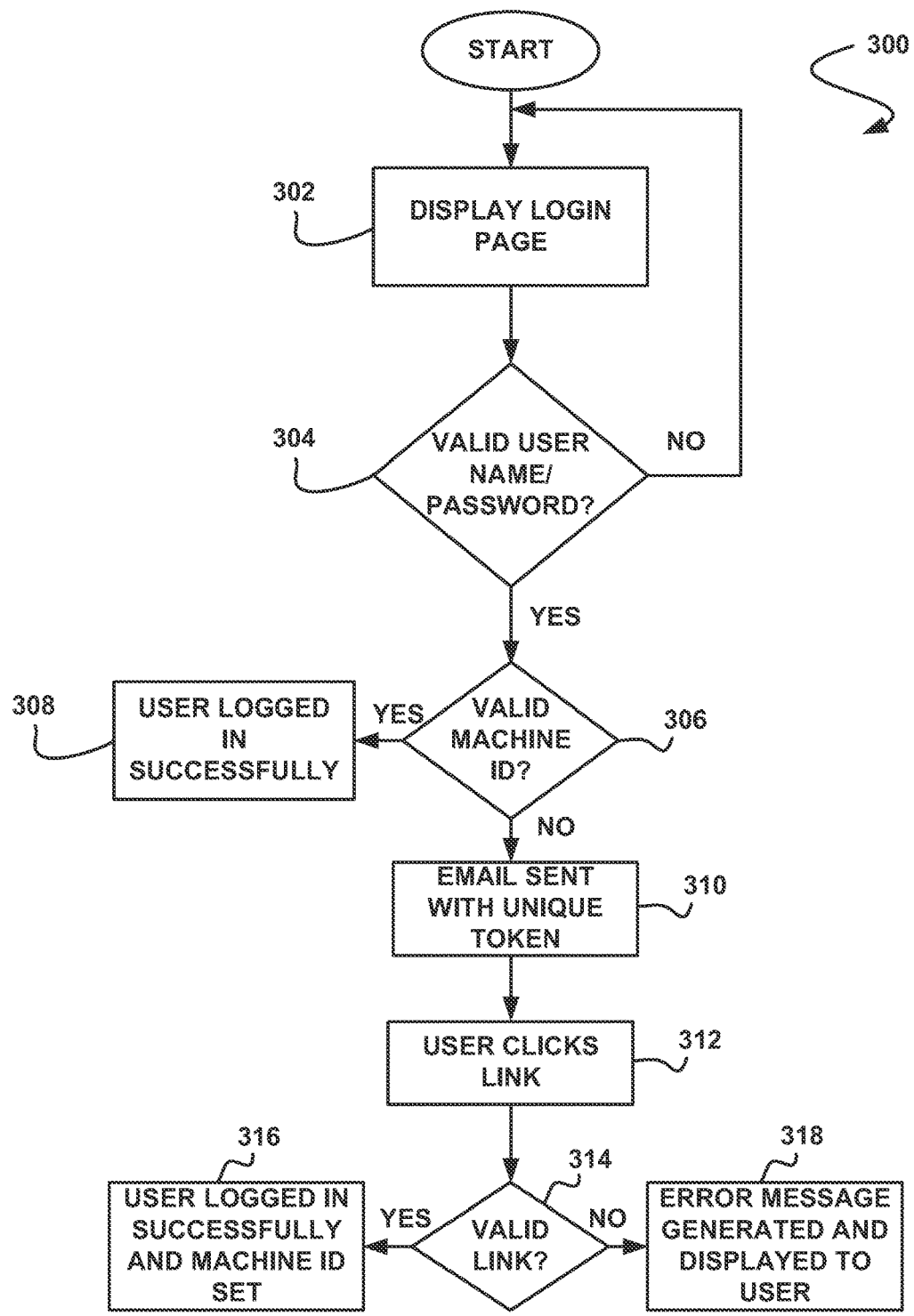
FIG. 3 shows a method for managing a risk of access to an on-demand service as a condition of permitting access to the on-demand service, in accordance with another embodiment.

FIG. 3 shows a method 300 for managing a risk of access to an on-demand service as a condition of permitting access to the on-demand service, in accordance with another embodiment. As an option, the present method 300 may be implemented in the context of the details of FIGS. 1-2. Of course, however, the method 300 may be carried out in any desired environment. Again, the aforementioned definitions may apply during the present description.

As shown, a login page is displayed to a user. See operation 302. Using this login page, a user may enter login information such as a username and password. This login information may be provided as a request for access to a server associated with an on-demand service. As an option, the request may also include a machine identifier (ID) of a device (e.g. a laptop computer, desktop computer, handheld computer, etc.) that the user is using to perform the login.

Once the user enters in the login information, it is determined whether the username and password entered by the user are valid. See operation 304. If the username and password are valid, it is determined whether the machine ID of the user device is valid. See operation 306.

In this case, validity of the machine ID may be determined by comparing the machine ID to one or more machine IDs of devices associated with the user. Information regarding the one or more machine IDs of the devices associated with the user may be accessible by the on-demand service. If it is determined that the machine ID is a valid machine ID, the user is logged in and allowed access to the on-demand service. See operation 308.

If the machine ID is not recognized, and it determined that the machine ID is not a valid machine ID, an email including a unique token is sent to the user. See operation 310. The user may then select a link provided in the email. See operation 312.

It is then determined whether the link is a valid link. See operation 314. If the link is a valid link, the user is logged in and the machine ID of the user device is set. See operation 316.

If it is determined that the link is not a valid link, an error message is generated and displayed to the user. See operation 318. As an option, this error message may be displayed to the user using the login screen.

Using this technique, a request to access an on-demand service may be received from a requestor and it may be determined whether the request is from a source providing risk. The risk of access to the on-demand service may be assessed and managed as a condition of permitting the requestor to access the on-demand service. Thus, a user and an associated device that is attempting to login to an on-demand service may be challenged, using a user interface, and/or using an API. For example, the API of the on-demand service may use a security token in order to validate a computer of the user attempting to login. The on-demand service may also check the computer attempting to login against one or more white lists or black lists to assess the level of risk in permitting the login.

It should be noted that any individual challenge of the user credentials or combination of challenges may be utilized. For example, a user interface challenge may be utilized such that as a user logs into an on-demand service of an organization from an unknown IP address and browser, the user may be challenged. In this case, browsers may be tracked using cookies and IP addresses may be tracked in an on-demand service database. As noted above, the challenge may come in the form of an email sent to an email account stored by the on-demand service and the user may follow a link included in the email to login and register the computer.

As another example, API security tokens may be utilized. In this case, an API may require a security token to be utilized when an unknown IP address is encountered. The token may be issued via email and may follow a life span of a user password. The token may be configured to work on any version of the API login call. Furthermore, in order to issue a token, a user may access an interface to reset or set a security token. By using this interface, a user may request an email with the token.

In another case, unknown IP addresses may be identified as part of an identification step. In order for a computer to become known based on an IP address, the on-demand service may locate the computer on a white list. The white list may include an entity or organization wide white list such that all members of the organization (e.g. users or tenants, etc.) are identified. This entity wide white list may be utilized to allow users to specify known IP ranges. As an option, the on-demand service may be configured such that any ranges added to the entity wide white list may not be challenged in the user interface or API.

Figure 4A:
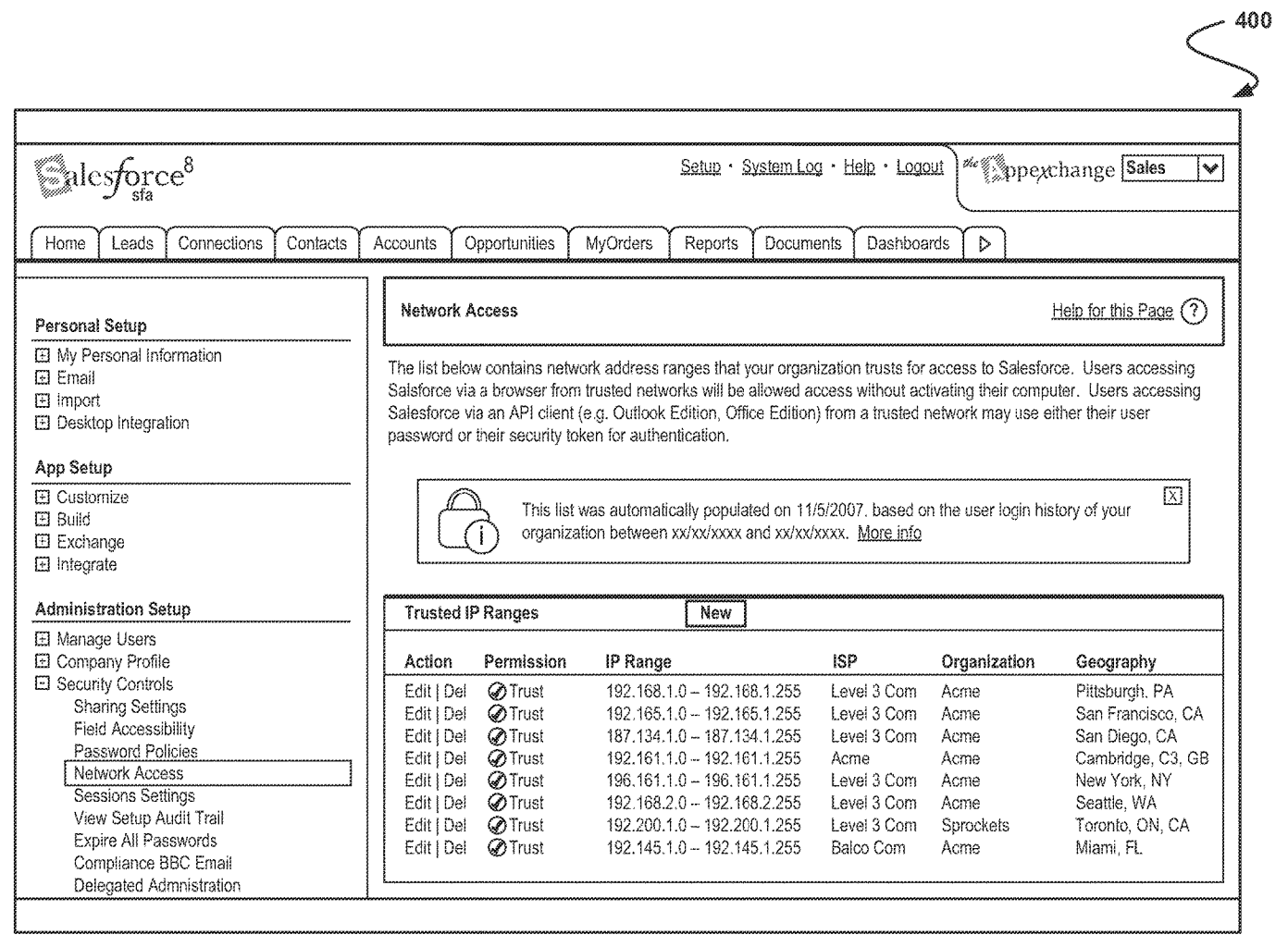

FIG. 4A shows a user interface 400 for configuring the management of a risk to an on-demand service, in accordance with one embodiment. As an option, the user interface 400 may be implemented in the context of the details of FIGS. 1-3. Of course, however, the user interface 400 may be implemented in any desired environment. Further, the aforementioned definitions may apply during the present description.

As shown, the interface 400 shows a plurality of entities and corresponding IP address ranges. In this case, a user may utilize the interface 400 to manage trusted entities and corresponding IP address ranges. Using this interface 400, the user may click a "New" button to add a new trusted IP address range.

Figure 4B:
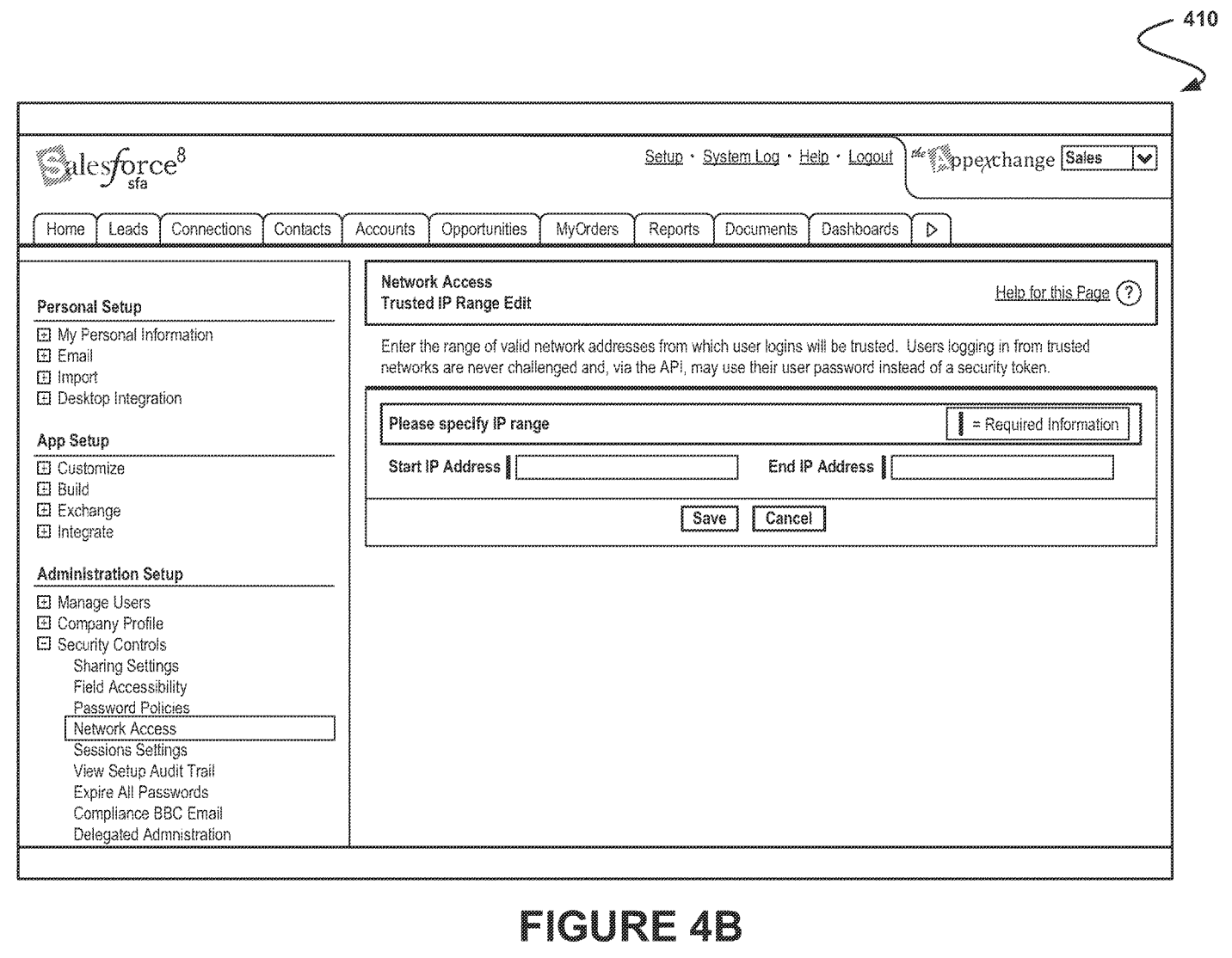

FIG. 4B shows a user interface 410 for configuring the management of a risk to an on-demand service, in accordance with another embodiment. As an option, the user interface 410 may be implemented in the context of the details of FIGS. 1-4A. Of course, however, the user interface 410 may be implemented in any desired environment. The aforementioned definitions may apply during the present description.

As shown, the interface 410 may be utilized to add a new trusted IP address range. In this case, a user may be permitted to enter a range of IP addresses including a start IP address and an end IP address.

Figure 4C:
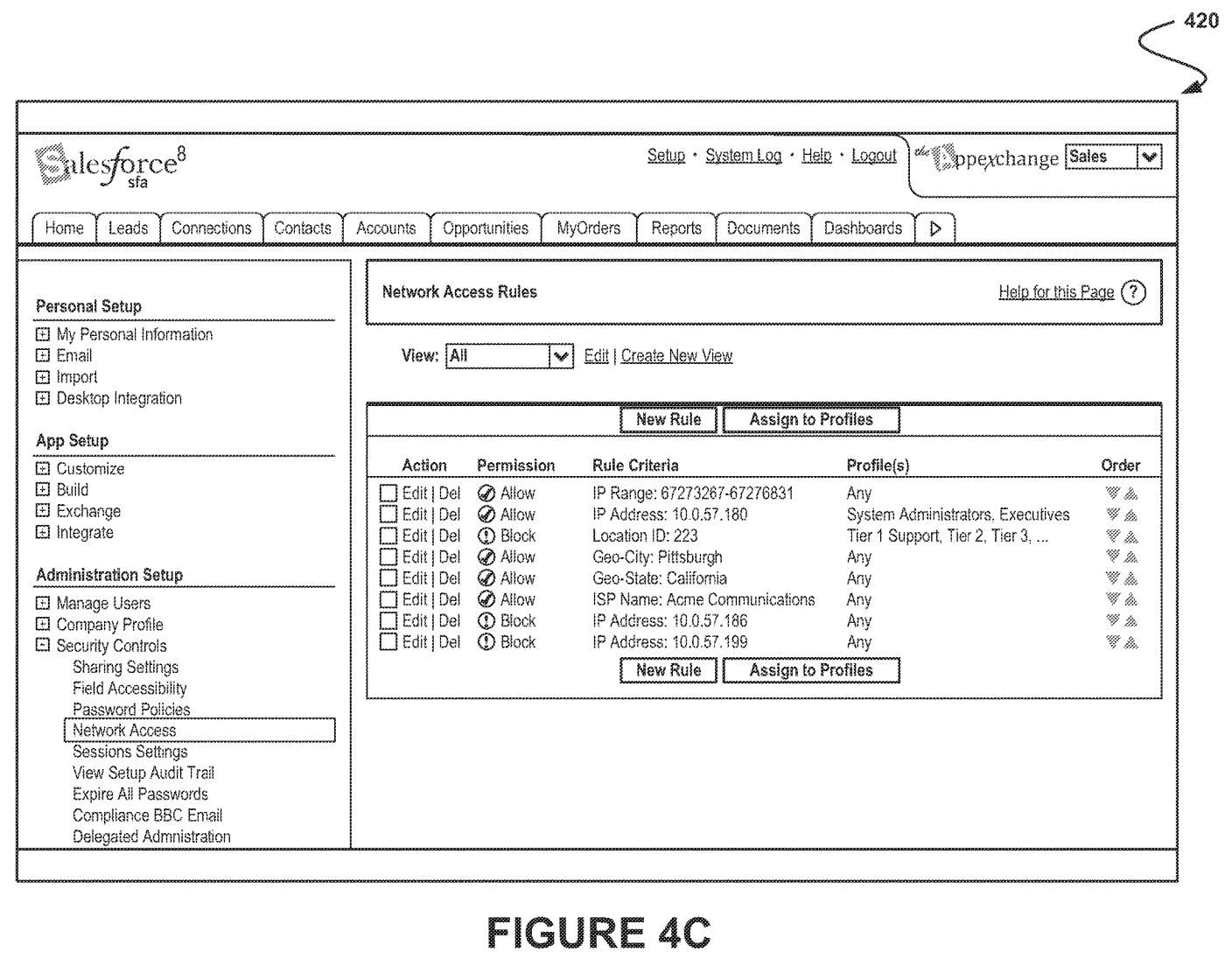

FIG. 4C shows a user interface 420 for configuring the management of a risk to an on-demand service, in accordance with another embodiment. As an option, the user interface 420 may be implemented in the context of the details of FIGS. 1-4B. Of course, however, the user interface 420 may be implemented in any desired environment. Again, the aforementioned definitions may apply during the present description.

As shown, the interface 420 shows a plurality of entities and corresponding IP address ranges. In this case, a user may utilize the interface 420 to manage trusted and untrusted entities and corresponding IP address ranges. Using this interface 420, the user may allow or block entities and corresponding IP address ranges.

System Overview

Figure 5:
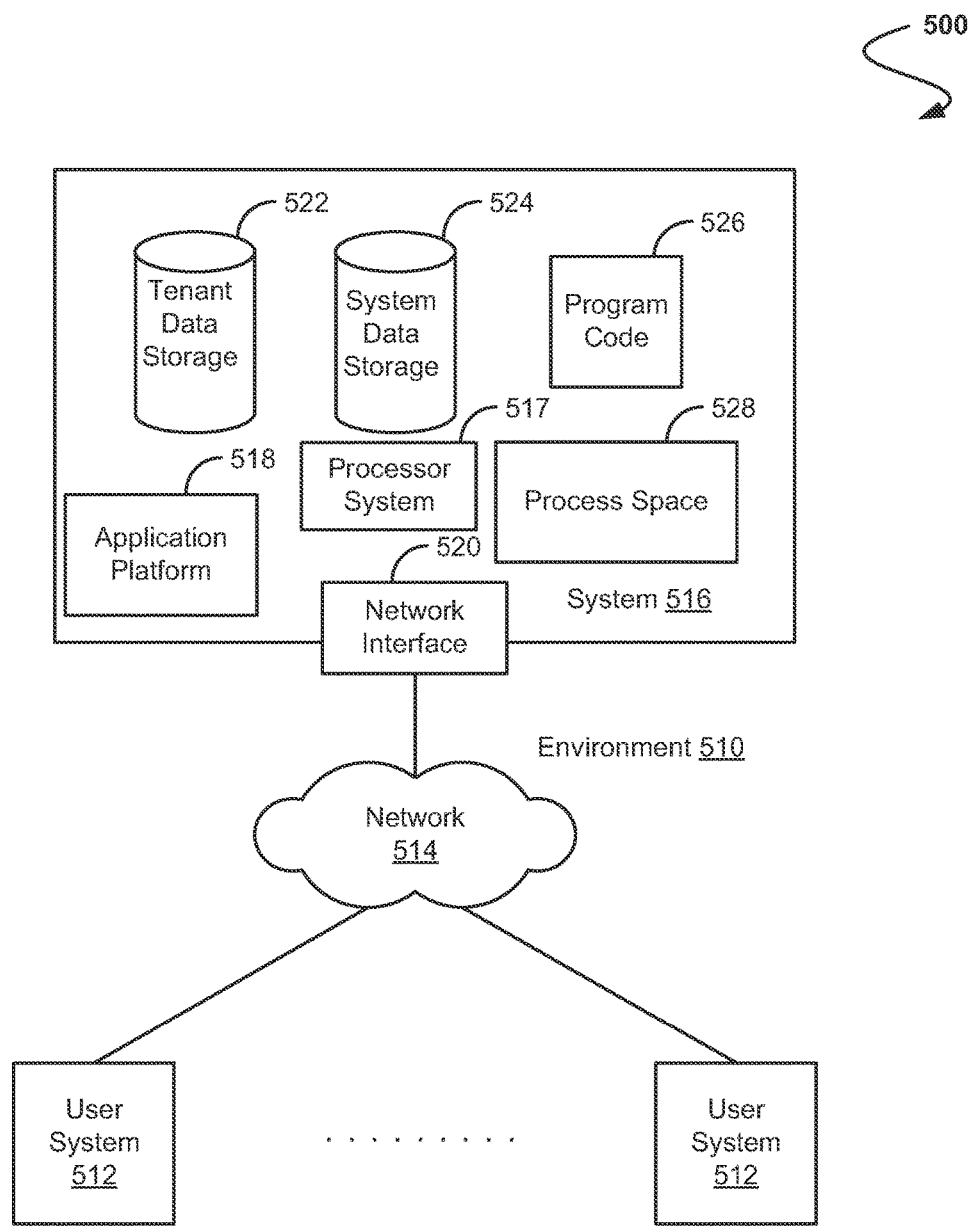
FIG. 5 illustrates a block diagram of an example of an environment wherein an on-demand database service might be used.

FIG. 5 illustrates a block diagram of an environment 510 wherein an on-demand database service might be used. As an option, any of the previously described embodiments of the foregoing figures may or may not be implemented in the context of the environment 510. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in FIG. 6) user systems 512 might interact via a network with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

Figure 6:
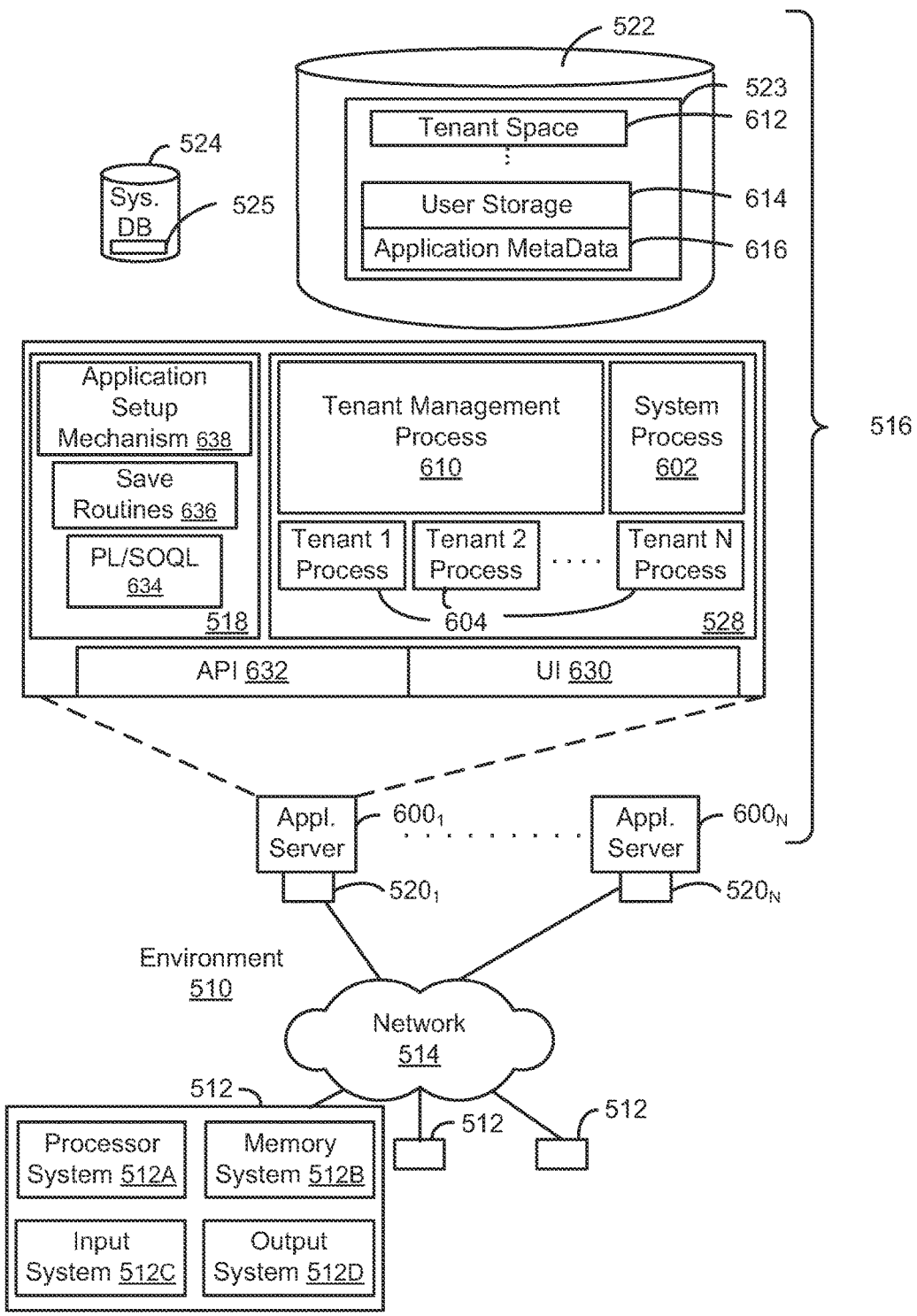
FIG. 6 illustrates a block diagram of an embodiment of elements of FIG. 5 and various possible interconnections between these elements.

One arrangement for elements of system 516 is shown in FIG. 6, including a network interface 520, application platform 518, tenant data storage 522 for tenant data 523, system data storage 524 for system data accessible to system 516 and possibly multiple tenants, program code for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 6 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 530, Application Program Interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned U.S. Provisional Patent Application No. 60/828,192 entitled, "PROGRAMMING LANGUAGE METHOD AND SYSTEM FOR EXTENDING APIS TO EXECUTE IN CONJUNCTION WITH DATABASE APIS," by Craig Weissman, filed Oct. 4, 2006, which is incorporated in its entirety herein for all purposes. Invocations to applications may be detected by one or more system processes, which manage retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g. an application server 600 in system 516) automatically generates one or more SQL statements (e.g. one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in one or more of the following published applications: US2003/0233404, titled "OFFLINE SIMULATION OF ONLINE SESSION BETWEEN CLIENT AND SERVER," filed Nov. 4, 2002, now issued as U.S. Pat. No. 9,171,049; US2004/0210909, titled "JAVA OBJECT CACHE SERVER FOR DATABASES," filed Apr. 17, 2003, now issued as U.S. Pat. No. 7,209,929; US2005/0065925, titled "QUERY OPTIMIZATION IN A MULTI-TENANT DATABASE SYSTEM," filed Sep. 23, 2003, now issued as U.S. Pat. No. 7,529,728; US2005/0223022, titled "CUSTOM ENTITIES AND FIELDS IN A MULTI-TENANT DATABASE SYSTEM," filed Apr. 2, 2004, now issued as U.S. Pat. No. 7,779,039; US2005/0283478, titled "SOAP-BASED WEB SERVICES IN A MULTI-TENANT DATABASE SYSTEM," filed Jun. 16, 2004, now issued as U.S. Pat. No. 8,533,229; and/or US2006/0206834, titled "SYSTEMS AND METHODS FOR IMPLEMENTING MULTI-APPLICATION TABS AND TAB SETS," filed Mar. 8, 2005, now issued as U.S. Pat. No. 7,774,366; which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A non-transitory machine-readable medium carrying one or more sequences of instructions which, when executed by one or more processors, cause the one or more processors to:

receiving, with one or more hardware processors, a request to access an on-demand service from a requestor associated with one of a plurality of entities of the on-demand service;

determining, with the one or more hardware processors, that the request to access the on-demand service is from a source providing a risk of access, the determination being based at least in part on stored information associated with at least one of a plurality of users or the one of the plurality of entities, wherein the request has an associated one-time use token that cannot be reused and expires after a predetermined amount of time; and managing, with the one or more hardware processors, the risk of access to the on-demand service by the requestor as a condition of permitting the requestor to access the on-demand service by providing an additional authentication sequence selected based on whether a requestor device is known, wherein the additional authentication sequence comprises completing additional subsequent authentication communications with the requestor device.

2. The non-transitory machine-readable medium of claim 1, wherein the on-demand service includes an on-demand database service.

3. The non-transitory machine-readable medium of claim 2, wherein the on-demand service includes a multi-tenant on-demand database service.

4. The non-transitory machine-readable medium of claim 1, wherein managing the risk of access to the on-demand service by the requestor includes generating a document.

5. The non-transitory machine-readable medium of claim 1, wherein the determination that the request is from the source providing the risk of access is further based, at least in part, on the device associated with the requestor.

6. The non-transitory machine-readable medium of claim 5, wherein it is determined that the request is from the source providing the risk of access because the device associated with the requestor has not previously been associated with the at least one of a plurality of users identified by stored information of the one of the plurality of entities of the on-demand service to which the access is requested.

7. The non-transitory machine-readable medium of claim 5, wherein it is determined that the request is from the source providing the risk of access because the device associated with the requestor has previously been associated with the at least one of a plurality of users identified by stored information of the one of the plurality of entities of the on-demand service to which the access is requested.

8. The non-transitory machine-readable medium of claim 6, wherein managing the risk of access includes generating a document and permitting the requestor access to the on-demand service in response to:
the device associated with the requestor not being previously associated with the at least one of the plurality of users identified by the stored information of the one of the plurality of entities of the on-demand service to which the access is requested, and
providing the valid token to the requestor.

9. The non-transitory machine-readable medium of claim 6, wherein managing the risk of access includes generating a document and providing the requestor access to the on-demand service in response to:
the device associated with the requestor being previously associated with the at least one of the plurality of users identified by the stored information of the one of the plurality of entities of the on-demand service to which the access is requested, and
providing the valid token to the requestor.

10. The non-transitory machine-readable medium of claim 1, wherein managing the risk of access to the on-demand service by the requestor includes comparing information in the request to access the on-demand service with a list of at least one of users and entities pre-determined to be granted access to the on-demand service.

11. A method, comprising:
receiving, with one or more hardware processors, a request to access an on-demand service from a requestor associated with one of a plurality of entities of the on-demand service;
determining, with the one or more hardware processors, that the request to access the on-demand service is from a source providing a risk of access, the determination being based at least in part on stored information associated with at least one of a plurality of users or the one of the plurality of entities, wherein the request has an associated one-time use token that cannot be reused and expires after a predetermined amount of time; and
managing, with the one or more hardware processors, the risk of access to the on-demand service by the requestor as a condition of permitting the requestor to access the on-demand service by providing an additional authentication sequence selected based on whether a requestor device is known, wherein the additional authentication sequence comprises completing additional subsequent authentication communications with the requestor device.

12. An apparatus, comprising:
a processor; and
one or more stored sequences of instructions which, when executed by the processor, cause the processor to:
receiving, with one or more hardware processors, a request to access an on-demand service from a requestor associated with one of a plurality of entities of the on-demand service;
determining, with the one or more hardware processors, that the request to access the on-demand service is from a source providing a risk of access, the determination being based at least in part on stored information associated with at least one of a plurality of users or the one of the plurality of entities, wherein the request has an associated one-time use token that cannot be reused and expires after a predetermined amount of time; and
managing, with the one or more hardware processors, the risk of access to the on-demand service by the requestor as a condition of permitting the requestor to access the on-demand service by providing an additional authentication sequence selected based on whether a requestor device is known, wherein the additional authentication sequence comprises completing additional subsequent authentication communications with the requestor device.

13. The method of claim 11, wherein it is determined that the request is from the source providing the risk of access because the device associated with the requestor has not previously been associated with the at least one of a plurality of users identified by stored information of the one of the plurality of entities of the on-demand service to which the access is requested.

14. The method of claim 11, wherein it is determined that the request is from the source providing the risk of access because the device associated with the requestor has previously been associated with the at least one of a plurality of users identified by stored information of the one of the plurality of entities of the on-demand service to which the access is requested.

15. The method of claim 11, wherein managing the risk of access includes generating a document and permitting the requestor access to the on-demand service in response to:
the device associated with the requestor not being previously associated with the at least one of the plurality of users identified by the stored information of the one of the plurality of entities of the on-demand service to which the access is requested, and
providing the valid token to the requestor.

16. The method of claim 11, wherein managing the risk of access includes generating a document and providing the requestor access to the on-demand service in response to:
the device associated with the requestor being previously associated with the at least one of the plurality of users identified by the stored information of the one of the plurality of entities of the on-demand service to which the access is requested, and
providing the valid token to the requestor.

17. The apparatus of claim 12, wherein it is determined that the request is from the source providing the risk of access because the device associated with the requestor has not previously been associated with the at least one of a plurality of users identified by stored information of the one of the plurality of entities of the on-demand service to which the access is requested.

18. The apparatus of claim 12, wherein it is determined that the request is from the source providing the risk of access because the device associated with the requestor has previously been associated with the at least one of a plurality of users identified by stored information of the one of the plurality of entities of the on-demand service to which the access is requested.

19. The apparatus of claim 12, wherein managing the risk of access includes generating a document and permitting the requestor access to the on-demand service in response to:
the device associated with the requestor not being previously associated with the at least one of the plurality of users identified by the stored information of the one of the plurality of entities of the on-demand service to which the access is requested, and providing the valid token to the requestor.

20. The apparatus of claim 12, wherein managing the risk of access includes generating a document and providing the requestor access to the on-demand service in response to:

the device associated with the requestor being previously associated with the at least one of the plurality of users identified by the stored information of the one of the plurality of entities of the on-demand service to which the access is requested, and providing the valid token to the requestor.

\* \* \* \* \*